March 26, 1957  J. H. KARLAN ET AL  2,786,359
WATERPROOF PANEL SEAL NUT
Filed Jan. 14, 1955
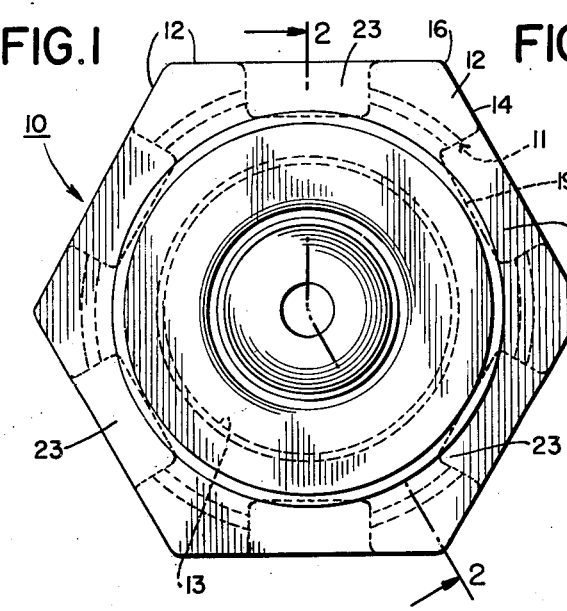
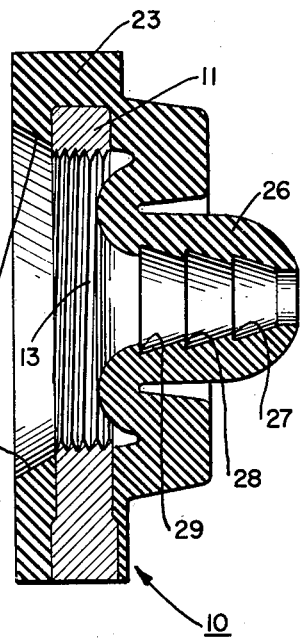
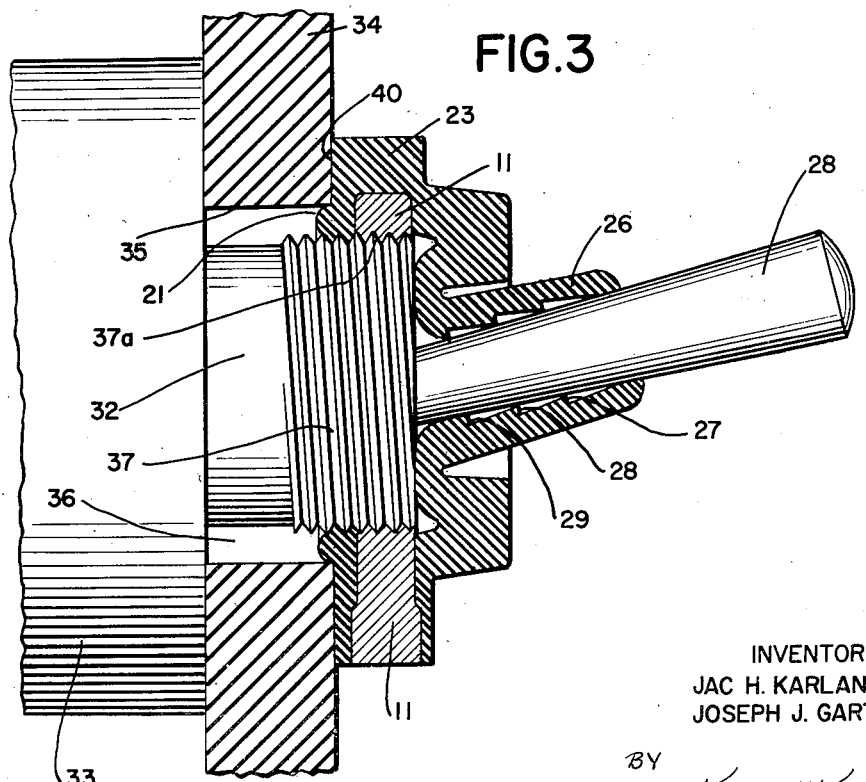
INVENTORS
JAC H. KARLAN
JOSEPH J. GARTNER
BY
Kenyon & Kenyon
ATTORNEYS

United States Patent Office 2,786,359
Patented Mar. 26, 1957

2,786,359

WATERPROOF PANEL SEAL NUT

Jac H. Karlan, Riverdale, N. Y., and Joseph J. Gartner, Hackensack, N. J., assignors to Panseal, Inc., Little Ferry, N. J., a corporation of New Jersey Application January 14, 1955, Serial No. 481,916

5 Claims. (Cl. 74—18.1)

This invention relates to a waterproof panel seal nut. Heretofore ordinary sealing nuts, such for example as the nut shown in Johanson et al. Patent No. 2,462,023, have not given reliable service under extreme conditions when used in air craft or marine instruments or switch panel boards. In mounts for toggle-switch levers, supposedly watertight nuts have been found pervious to fine wind-borne sand particles and salt spray, and are loosened by vibration.

The object of the present invention is to provide a panel seal nut which is reliable in operation under extremely adverse conditions of use, more especially for aircraft and marine installations, but also for other environments where high reliability is needed.

According to the present invention, a metal nut having wrench-engageable faces and a threaded bore extending from one side to the other of the nut, the nut-threads being adapted to mate with bolt-threads of corresponding configuration, is combined with a continuous integral sheath of rubber, preferably silicone rubber, firmly adherent to the metal as by molding on both sides of the nut and along part at least of each wrench-engageable face, thus locking the sheath to the nut and enclosing the nut against corrosion in all of its parts except the nut-threads and, in one modification, the portions of the wrench-engageable faces which are adjacent to the apices of the nut. Integral with such sheath is an annulus of rubber immediately surrounding and adjacent to one end of the nut-threads which is adapted, when uncompressed, to clear any bolt-threads with which the nut-threads are engaged, and is also adapted when placed under compression to engage with and lock upon such bolt-threads. Also integral with the sheath of rubber, and preferably made of silicone rubber, is a sleeve co-axial with the axis of the threaded bore of the nut; and formed in the inner surface of this sleeve are a plurality of circular groove-like recesses, respectively positioned along the sleeve at different distances from its end, each of these grooves or recesses being adapted to contain, and in the finished article containing, a body of stable lubricant compatible with the rubber used; when the rubber is silicone rubber, the preferred lubricant is dimethylpolysiloxane.

One form of device embodying the invention is here shown for purposes of illustration and not of limitation.

In the drawings—

Fig. 1 is an end elevation of a waterproof panel seal nut 10 made in accordance with this invention;

Fig. 2 is a vertical section in the plane 2—2 of Fig. 1; and

Fig. 3 is a vertical section of nut 10 (in the same sectional plane as Fig. 2) showing the same applied to the shank 32 of a toggle switch protruding through an opening in an instrument panel.

The panel seal nut 10 according to this invention comprises a metallic nut 11 having external wrench-engageable faces 12 and an internally screw-threaded axial bore 13 extending from end to end thereof. Each face 12 of the nut comprises three portions—end portions 14, 15 which are immediately adjacent to the respective apices 16, 17 of the nut, and a central portion 19 in which the metal of the nut is cut away so that the remaining part of the surface is materially below the plane established by faces 14 and 15. The metal nut 11 thus described may be formed by usual methods of machining, but preferably is made by casting methods using a ceramic mold such as plaster of Paris or a fine-grained sand. A cast nut forms a better bond with the subsequently applied silicone rubber. Preferably the metal nut 11 is made of stainless steel.

Metal nut 11, formed as above described, is encased almost completely, except as mentioned below, in a sheath of resilient silicone rubber, bonded to the metal by methods of molding which are well-known and therefore not described here. The mold in which the silicone rubber is bonded to the metal nut is so shaped as to cause the rubber to become firmly adherent to all exposed surfaces of the nut except the nut-threads 13 thereof. In areas where the rubber sheath overlies a wrench-engageable surface, particularly near the apices 16, 17 of the nut, the sheath should be exceedingly thin, for instance a millimeter in thickness or less, or no rubber at all may be provided at this point. Elsewhere, more particularly along each side of the nut, the sheath is preferably thicker and in any case not less than about 1.5 mm. The body of silicone rubber is preferably braced from side to side across the nut and locked thereto by formation of solid necks of rubber 23, 23 at approximately the mid-point of each flat wrench-engageable face of the nut, these necks lying within the cut-away portion 19 previously mentioned.

On one face of the nut, here called the inner face, an annulus 20 of rubber is formed surrounding and immediately adjacent one end of nut-threads 13, for a purpose to be described. On the other, or outer, face of the nut the silicone rubber is shaped to form an integral sleeve 26 adapted to engage tightly upon the lever 28 of a toggle switch. On the inner surface of sleeve 26 are formed a plurality of circular groove-like recesses 27, 28, 29, of which the preferred number is three though more or less may be provided as required. These grooves are for containing a supply of lubricant as described below.

Silicone rubber is the preferred material for the sheath because of its high temperature stability and its resistance to climatic conditions, saltwater spray and ultra-violet light. However, if desired, latex rubber may be used for its superior abrasion resistance.

In use, a nut according to this invention is applied (see Fig. 3) to the externally screw-threaded shank 32 of a toggle switch, or other like control member, whose body portion 33 is disposed rearwardly of an instrument panel 34 having therein a drilled opening 35 of diameter somewhat greater than the diameter of shank 32. Customarily an annular space 36 is left around shank 32. When a nut according to this invention is to be applied to secure shank 32 in an opening such as 35, the toggle lever 28 is inserted through sleeve 26, and the nut is then engaged upon bolt-threads 37 formed externally upon shank 32. Before the nut has been tightened against panel 34 and before rubber annulus 20 has been distorted by compression, said annulus passes freely over bolt-threads 37 without engaging the same. When the nut has been brought up tight against the surface of panel 34, and force is applied to compress it thereagainst, the effect is to distort annulus 20 by compression and thus to force the rubber composing said annulus to engage bolt-threads 37a and thereby lock the nut against further movement, and also to expand into space 36 between the external surface of shank 32 and the internal surface of opening 35, forming a watertight annular plug 21 therein.

A great deal of mechanical force may be applied to the wrench-engageable surfaces of the nut at or near the apices thereof because here the protective layer of silicone rubber may be very thin. Consequently a high degree of compression can be brought about between the nut and the surface of panel 34, and between the rubber and bolt-threads 37a, despite the fact that the wrench may be exerting its force against the nut through a body of rubber.

The grooves 27, 28 and 29, on the inside of sleeve 26 are filled with a supply of stabilized lubricant which is compatible with the rubber used. That is, the lubricant must be such as will not dissolve or swell the rubber. For example, petroleum greases cannot be used with latex rubber. We find that dimethylpolysiloxane lubricant is compatible for our purposes with silicone rubber and is in addition stable in the presence of heat, resistant to various forms of corrosion, and immiscible with water. It also effectively seals the interface between the surface of lever 28, and the inner surface of sleeve 26, against passage of moisture and small particles of solid matter such as dust or grit. Preferably the grooves are filled with this lubricant before the finished panel seal nut is shipped.

While the preferred form of the invention has been herein described for purposes of illustration and not of limitation, the invention itself is defined in the appended claims.

What is claimed is:

1. In a panel seal nut for use with toggle switches and the like, a metal nut having wrench-engageable faces and a threaded bore extending from one side to the other of said nut and adapted to mate with bolt-threads of corresponding configuration, in combination with a continuous integral sheath of rubber firmly adherent to the metal on both sides of said nut and along part at least of each wrench-engageable face and having integral neck portions extending from side to side of the nut to lock said sheath to the nut, said rubber sheath leaving the nut-threads exposed, and an annulus of rubber surrounding and immediately adjacent one end of said nut-threads adapted when free of compression to clear any bolt-threads with which the nut-threads are engaged and under compression to engage with and lock upon such bolt-threads, said annulus being integral with the sheath and thereby being locked to the nut.

2. In a panel seal nut for use with toggle switches and the like, a metal nut having a threaded bore extending from one side to the other of said nut and adapted to mate with bolt-threads of corresponding configuration, in combination with a continuous integral sheath of silicone rubber firmly adherent to the metal on each side of said nut and having integral neck portions extending from side to side of the nut, said sheath leaving the nut-threads exposed, an annulus of rubber integral with said sheath surrounding and immediately adjacent to said nut-threads at one end of the bore adapted when free of compression to clear any bolt-threads with which the nut-threads are engaged and under compression to engage with and lock upon such bolt-threads, a sleeve of silicone rubber integral with said sheath and coaxial with said bore at the other end thereof, and pocket means formed in the inner surface of said sleeve adapted to hold and retain a supply of stable lubricant compatible with said silicone rubber.

3. In a panel seal nut for use with toggle switches and the like, a metal nut having a threaded bore extending from one side to the other of said nut and adapted to mate with bolt-threads of corresponding configuration, in combination with a continuous integral sheath of silicone rubber firmly adherent to the metal on each side of said nut and having integral neck portions extending from side to side of the nut, said rubber sheath leaving the nut-threads exposed, an annulus of rubber integral with said sheath and surrounding and immediately adjacent to said nut-threads at one end of the bore adapted when free of compression to clear any bolt-threads with which the nut-threads are engaged and under compression to engage with and lock upon such bolt-threads, a sleeve of silicone rubber integral with said sheath and coaxial with said bore at the other end thereof, a pocket means for storage of lubricant formed in the inner surface of said sleeve, and a body of dimethylpolysiloxane lubricant packed in at least one of said pocket means.

4. In a panel seal nut for use with toggle switches and the like, a threaded metal nut, an integral sheath of silicone rubber bonded to the sides and wrench-engageable faces of the nut and leaving the threads thereof exposed, a sleeve of silicone rubber formed integral with said sheath and positioned coaxially with the central axis of said nut, a plurality of grooves formed in the inner surface of said sleeve, and a body of dimethylpolysiloxane lubricant packed in at least one of said grooves.

5. In a panel seal for use with toggle switches and the like, a threaded metal nut, an integral sheath of silicone rubber bonded to the sides and wrench-engageable faces of the nut and leaving the threads thereof exposed, a sleeve of silicone rubber formed integral with said sheath and positioned coaxially with the central axis of said nut, a plurality of circular groove-like recesses formed in the inner surface of said sleeve and repectively positioned along the sleeve at different distances from its end, each of said recesses containing a supply of a stable lubricant compatible with silicone rubber.

References Cited in the file of this patent

UNITED STATES PATENTS

| | | |
|---|---|---|
| 2,440,943 | Gonsett et al. | May 4, 1948 |
| 2,568,056 | Corder | Sept. 18, 1951 |
| 2,625,446 | Bjornstad | Jan. 13, 1953 |

OTHER REFERENCES

"Automotive Industries," vol. 110, No. 2. Jan. 15, 1954. Advertisement opposite page 210 entitled "Dow Corning Silicone News;" No. 4.